US008208781B1

(12) United States Patent
Morgan et al.

(10) Patent No.: US 8,208,781 B1
(45) Date of Patent: Jun. 26, 2012

(54) FIBER OPTIC CONNECTOR PANEL

(75) Inventors: Joshua Morgan, Madison, AL (US); Jason Crawford, Arab, AL (US)

(73) Assignee: Adtran, Inc., Huntsville, AL (US)

( * ) Notice: Subject to any disclaimer, the term of this patent is extended or adjusted under 35 U.S.C. 154(b) by 284 days.

(21) Appl. No.: 12/629,919

(22) Filed: Dec. 3, 2009

(51) Int. Cl.
*G02B 6/00* (2006.01)

(52) U.S. Cl. ........ 385/135; 385/134; 385/136; 385/137; 385/138; 385/139

(58) Field of Classification Search ........... 385/134–139
See application file for complete search history.

(56) References Cited

U.S. PATENT DOCUMENTS

| | | | | |
|---|---|---|---|---|
| 4,824,196 A * | 4/1989 | Bylander | | 385/134 |
| 4,900,123 A * | 2/1990 | Barlow et al. | | 385/53 |
| 5,119,459 A * | 6/1992 | Meyerhoefer et al. | | 385/135 |
| 5,511,144 A | 4/1996 | Hawkins et al. | | 385/135 |
| 6,175,079 B1 * | 1/2001 | Johnston et al. | | 174/50 |
| 6,385,381 B1 * | 5/2002 | Janus et al. | | 385/135 |
| 7,439,453 B2 | 10/2008 | Murano et al. | | 174/543 |
| 7,460,757 B2 * | 12/2008 | Hoehne et al. | | 385/135 |
| 7,499,623 B2 | 3/2009 | Barnes et al. | | 385/135 |
| 7,509,016 B2 | 3/2009 | Smith et al. | | 385/135 |
| 7,522,805 B2 | 4/2009 | Smith et al. | | 385/135 |
| 7,574,093 B2 | 8/2009 | Holmberg et al. | | 385/135 |
| 7,583,885 B2 | 9/2009 | Kowalczyk et al. | | 385/135 |
| 7,751,675 B2 * | 7/2010 | Holmberg et al. | | 385/135 |
| 7,873,255 B2 * | 1/2011 | Reagan et al. | | 385/139 |
| 2008/0292261 A1 * | 11/2008 | Kowalczyk et al. | | 385/135 |
| 2009/0202214 A1 * | 8/2009 | Holmberg et al. | | 385/135 |
| 2009/0263096 A1 * | 10/2009 | Solheid et al. | | 385/135 |
| 2009/0263097 A1 * | 10/2009 | Solheid et al. | | 385/135 |
| 2009/0269954 A1 | 10/2009 | Loch et al. | | 439/108 |

* cited by examiner

*Primary Examiner* — Brian M. Healy
*Assistant Examiner* — Guy Anderson
(74) *Attorney, Agent, or Firm* — Allen, Dyer, Doppelt, Milbrath & Gilchrist, P.A.

(57) ABSTRACT

A fiber optic connector panel fits within a telecommunications fiber optic distribution cabinet and terminates and protects outside plant cables. A support panel is pivotally mounted into a telecommunications fiber optic distribution cabinet. A first cylindrically configured cable storage member is supported by the support panel and configured to store any slack fiber optic pigtails. A second cable storage member is supported by the support panel and configured to store any slack outside plant cable and jumpers. A fiber optic connector is supported by the support panel and configured to connect fiber optic pigtails and fiber optic jumpers. A splice storage member is supported by the support panel and configured to store fiber optic cable splices of the fiber optic pigtails and outside plant cable and jumpers of the fiber optic pigtails and outside plant cable and jumpers.

31 Claims, 3 Drawing Sheets

FIBER OPTIC CONNECTOR PANEL

FIELD OF THE INVENTION

This invention relates to fiber optic connector panels, and more particularly, this invention relates to fiber optic connector panels that terminate and protect outside plant cables.

BACKGROUND OF THE INVENTION

Legacy and current Broadband Digital Loop Carrier (BDLC) Outside Plant (OSP) enclosures are designed primarily for termination and distribution of copper-based subscriber circuits. The cabinets are typically designed with minimal space for other equipment (passive or active) in the system. Fiber-based applications, i.e., PON (passive optical network), on the other hand, have limited available space in the enclosure. This makes it difficult to terminate and manage the fiber cabling, which must be extended from the channel bank to the OSP environment, and eventually to the customer. Historically, this termination and management have been performed in a rack-mounted fiber termination panel, which includes:

1) A set of bulkhead panels to which a fiber pigtail is connected towards the OSP and a fiber jumper is connected that faces towards the channel bank;

2) Slack storage members for storage of slack in the OSP cable, pigtail, and jumper; and 3) A mechanism for storage and organization of the fusion splice, which terminates the pigtail to the OSP cable.

However, there is often insufficient space for the panel, or it is viewed as a waste of valuable rack space.

It is possible to take into consideration that a common method of providing lightning surge protection for copper pairs is via the use of a five-pin protector module (gas tube or solid state), which is plugged into a mating protector block. A typical form factor of this block is commonly known as the "307-type" form factor. This is a 10×10 protector block that snaps into a mounting arrangement in the cabinet into which it is mounted. As technology transitions to fiber-based applications, the need for these copper protector blocks is eliminated, resulting in wasted cabinet space if it is not re-captured.

SUMMARY OF THE INVENTION

In accordance with a non-limiting example, a fiber optic connector panel fits within a telecommunications fiber optic distribution cabinet and terminates and protects outside plant cables. A support panel has opposing sides and opposing ends and a pivot support member on either side at one end and is configured to pivotally mount the support panel into a telecommunications fiber optic distribution cabinet. In one aspect, at least one latch member is configured to latch the support panel into an unpivoted position. A first cylindrically configured cable storage member is supported by the support panel and configured to store any slack fiber optic pigtails. A second cable storage member is supported by the support panel and configured to store any slack outside plant cable and jumpers. A fiber optic connector is supported by the support panel and configured to connect fiber optic pigtails and fiber optic jumpers. A splice storage member is supported by the support panel and configured to store fiber optic cable splices of the fiber optic pigtails and outside plant cable and jumpers of the fiber optic pigtails and outside plant cable and jumpers.

In another aspect, the support panel is sized as a type 307 connector block configuration and is substantially rectangular configured. In yet another aspect, the first cylindrically configured cable storage member is mounted on the support panel and opposite the pivot support members. The second cylindrically configured cable storage member is mounted at the end opposite the first cylindrically configured cable storage member. In yet another aspect, first and second cylindrically configured cable storage members are spaced a distance from each other that is sufficient to create a clearance and allow any fiber optic pigtails and outside plant cable and jumpers to be inserted at the clearance between the cable storage members and then wrapped about a respective cable storage member.

In another aspect, the first and second cylindrically configured cable storage members are the same size. The fiber optic connector comprises an "n" position bulkhead fitting in another example. The fiber optic connector and the splice storage member are supported at opposing sides to each other and both in a medial section of the support panel at the respective sides. In yet another aspect, cable guide tubes are secured at either side of the end to be pivotally mounted within a telecommunications fiber optic distribution cabinet through which fiber optic jumpers or fiber optic outside plant cable are routed.

A telecommunications fiber optic distribution cabinet is also disclosed and includes an enclosure and at least one fiber optic connector panel pivotally mounted therein in accordance with a non-limiting example.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The fiber optic connector panel, in accordance with a non-limiting aspect, takes the place of a legacy copper terminating 307 block and mounts into the same apparatus or support, i.e., in this disclosure referred to as the telecommunications fiber optic distribution cabinet, as used currently for the 307 lightning protection block. The installation of the panel is "snap in," which makes the fiber transition relatively simple for an installer. The 307-type connector block typically provides protection for 96 to about 100 lines of copper-based subscriber services. As transition to fiber-based services occurs, the physical space consumed by the electronics that deliver the copper-based services could accommodate eight fiber-based services in one non-limiting aspect. Therefore, the fiber optic connector panel is configured to support conductivity, splice and the arrangement of the fiber cable associated with eight circuits in a non-limiting example.

It should be understood that there are potential follow-up products that can include passive optical network splitter devices that mount in the same form factor and could allow for some level of fiber splitting at the RT site. Currently, the trend for performing fiber splits of PON circuits includes extending PON circuits from the RT and splitting as the fiber run is extended to a location closer to the end customer site. This limits the buried or aerial fiber count. In some cases, however, the RT is located in close proximity to a number of end customers, and thus, a limited number of fiber splits would be desirable in the enclosure as part of the telecommunications fiber optic distribution cabinet.

Figure 1:
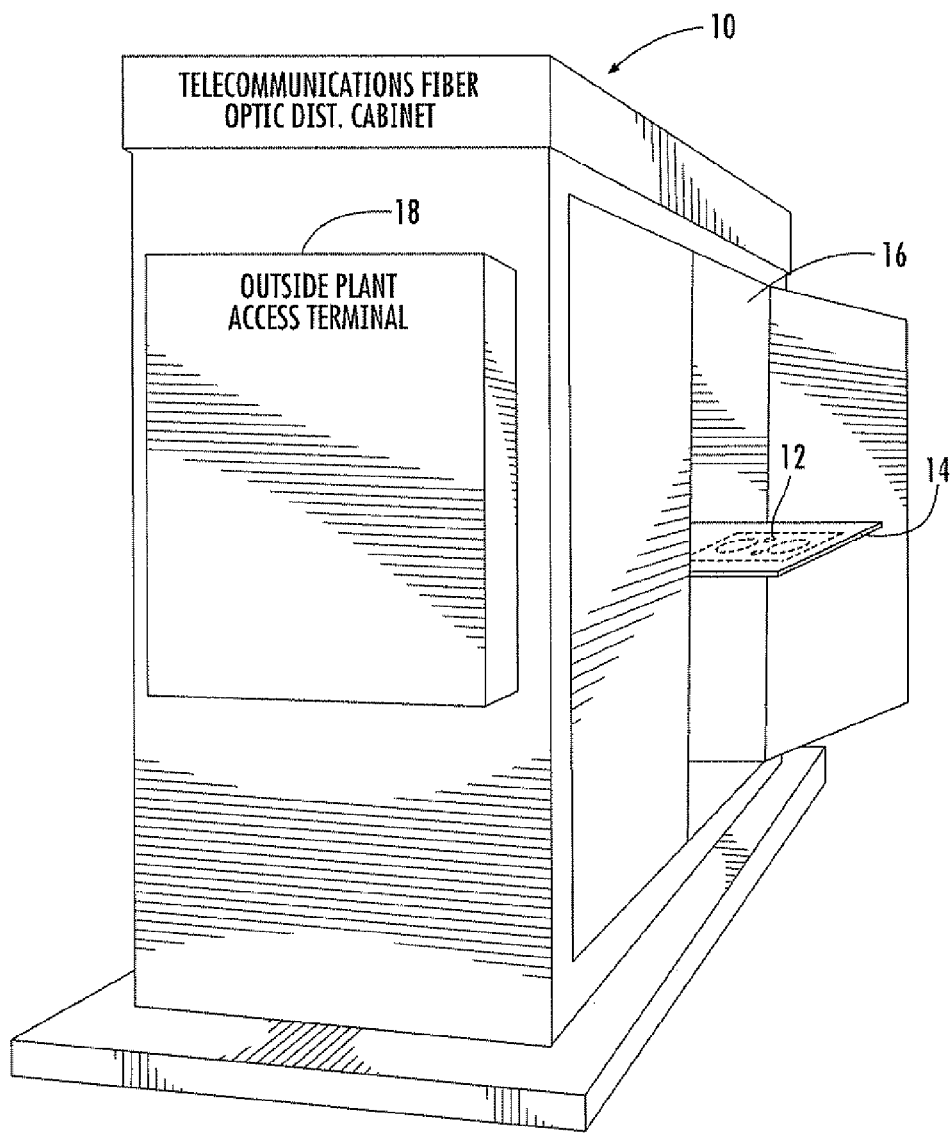
FIG. 1 is a perspective view of a telecommunications fiber optic distribution cabinet that includes a fiber optic connector panel pivotally mounted therein and in one aspect on a sliding support tray as illustrated.

Referring to FIG. 1, there is illustrated a general overall view of a telecommunications fiber optic distribution cabinet illustrated generally at 10 that is used to support at least one fiber optic connector panel that is shown by dashed lines at 12 and pivotally mounted on a sliding support tray 14 in accordance with a non-limiting aspect. This panel 12 terminates and protects outside plant cables. As shown, the cabinet 10 includes an enclosure 16 for many different panels and a smaller outside plant access terminal 18. Although FIG. 1 shows a general view of a telecommunications fiber optic distribution cabinet 10, it is illustrated to show that the cabinet 10 is not limited to any specific configuration or any particular dimensions and different embodiments could be used to hold one or more fiber optic connector panels 12 whether on sliding support trays or not. A connector panel could be positioned in a single unit outside plant access terminal.

Figure 2:
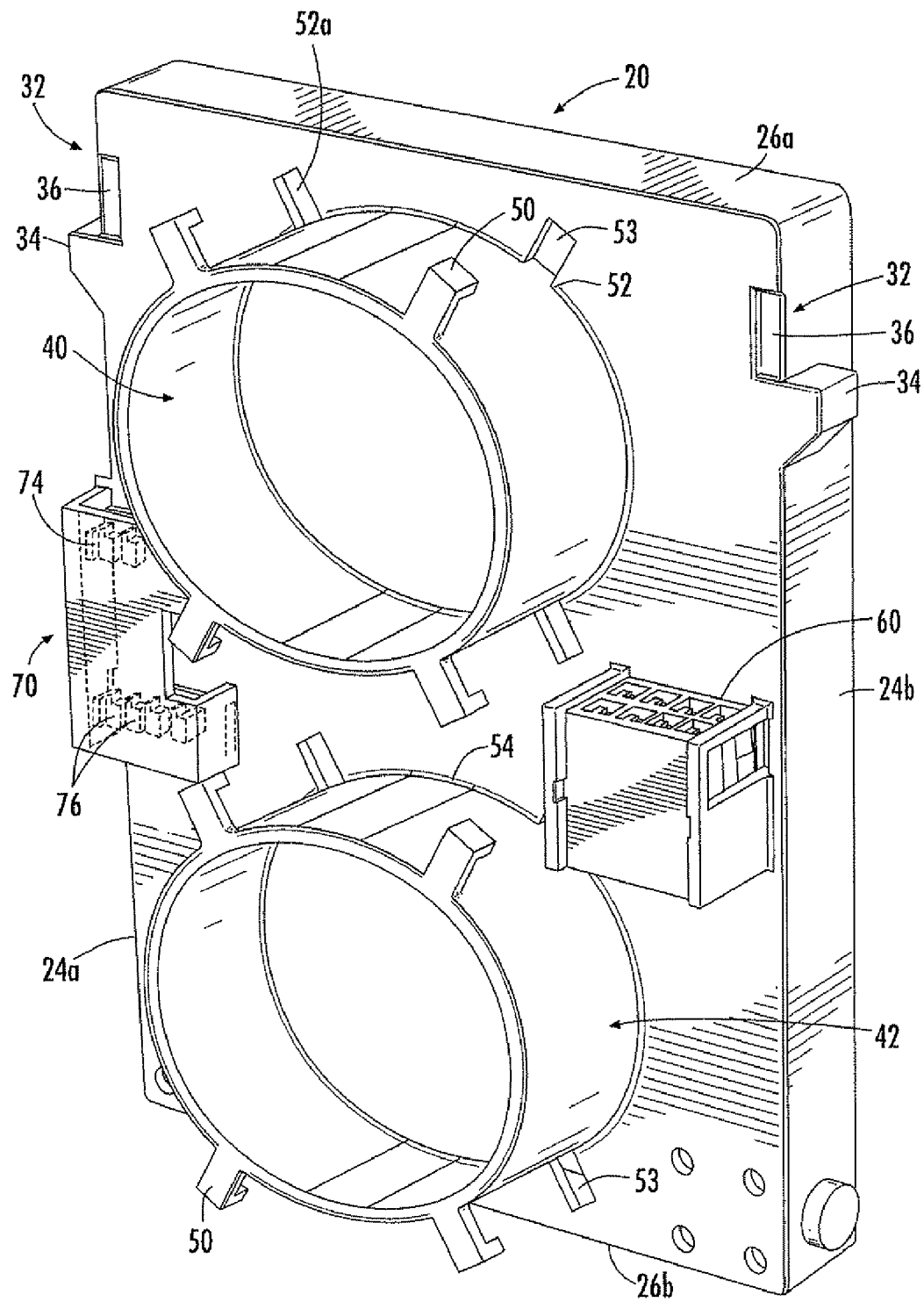
FIG. 2 is a perspective view of the fiber optic connector panel without fiber optic cables.
Figure 3:
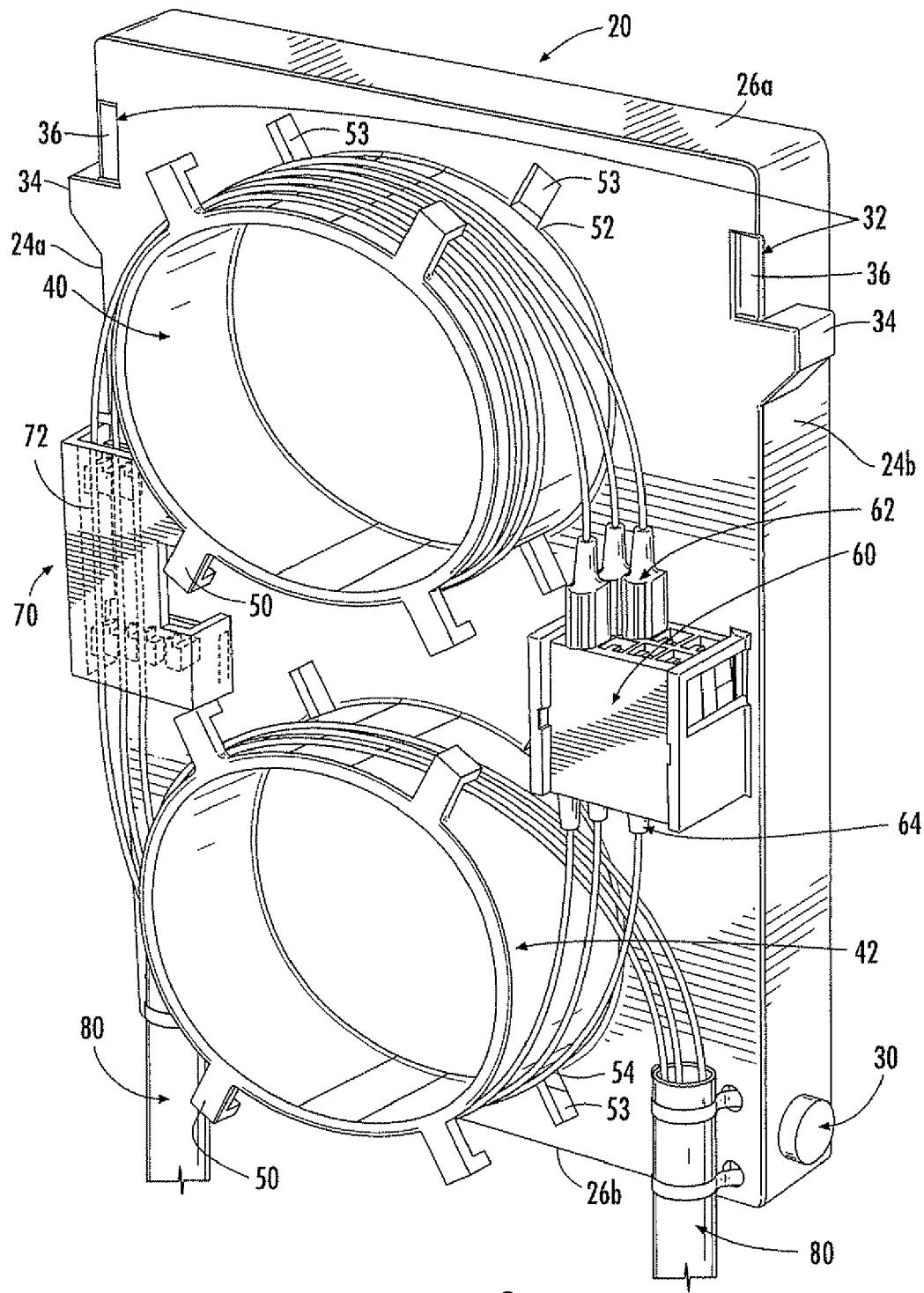
FIG. 3 is a perspective view of the fiber optic connector panel similar to that shown in FIG. 3, but showing the fiber optic cables.

Referring now to FIGS. 2 and 3, there is illustrated a fiber optic connector panel designated generally at 20 in those figures, in accordance with a non-limiting example. This panel 20 fits within the telecommunications fiber optic distribution cabinet 10 as shown in FIG. 1 and terminates and protects outside plant cables. As illustrated, a substantially rectangular configured support panel 22 is sized as a type 307 connector block configuration and has opposing sides 24a, 24b and opposing ends 28a, 28b. This support panel can be made from different materials generally used in those types of cabinets 10, and in one non-limiting example, the panel 22 is made from a non-conductive material. A pivot support member 30 is formed on either side 24a, 24b at the illustrated lower end 26b corresponding to the end that is pivotally mounted into the telecommunications fiber optic distribution cabinet 10. In this illustration, only one pivot support member is shown. As illustrated, the pivot support member 30 is formed as a cylindrical protrusion such as a cylindrical tab that forms a pivot connection and allows the panel to be snapped into a pivoting and secure arrangement with what typically are snap fit or forked support arms (not illustrated) positioned on a sliding support tray or on the cabinet itself and permit the cylindrical tab 30 to rotate enough to allow pivoting movement of the fiber optic connector panel 20.

At the opposite end 26a, the fiber optic connector panel, which is the top end in this illustration, at least one latch member 32 is formed and configured to latch the support panel 20 into a closed position when mounted and pivoted into a closed position in the telecommunications fiber optic distribution cabinet 10. In this embodiment, a latch member 32 is formed on either side 24a, 24b. The latch member 32 at either side is formed as bottom protrusion 34 that acts as a catch or stop and a slight indentation 36 that is partially cut into the panel material and forms a biased latch and catch mechanism such that when the fiber optic connector panel 20 is pivoted into a closed position within the distribution cabinet 10, the latch and catch mechanism biases inward slightly at the side, catches another catch member on the cabinet (not shown) and locks the support panel 20 against this catch member located on the distribution cabinet or another support.

As illustrated best in FIG. 3, a first cylindrically configured cable storage member 40 is supported at one end, and more particularly, near the top end 26a opposite the pivot support members 30 and configured to store any slack fiber optic pigtails. A second cable storage member 42 is supported at the opposite end 26b corresponding to the lower end and configured to store any slack outside plant cable and jumpers. In this illustrated embodiment, the first and second cylindrically configured cable storage members 40, 42 are substantially same size and formed substantially as cylindrical extensions that extend from the surface of the support panel 20. These storage members 40, 42 could be formed integral with the support panel 20 or formed as separate pieces and later secured thereon. As illustrated, each cylindrically configured cable storage member 40, 42 includes cable securement tabs 50 positioned along the upper circumferential edge of each cable storage member. In this embodiment as illustrated, the cable storage members 40, 42 are inserted into formed openings 52, 54 in the support panel 20. The cable storage members 40, 42 are secured to the support panel by any appropriate securement mechanism, such as an adhesive, threaded attachments, or other securement mechanisms known to those skilled in the art. Openings 53 could allow locking members on a bottom circumferential ridge of each storage member to be "twist locked" into position.

As shown, the first cylindrically configured cable storage member 40 is mounted by the support panel 20 at the end 26a opposite the pivot support members 30 and the second cylindrically configured cable storage member 42 is mounted at the opposing end 26b by the support panel opposite the first cylindrically configured cable storage member. Both storage members 40, 42 are substantially the same size and take up a substantial portion of the surface area of the support panel 20 as illustrated. The first and second cylindrically configured cable storage members 40, 42 are spaced a distance from each other sufficient to create a clearance and allow any fiber optic pigtails and outside plant cable and jumpers to be inserted at the clearance between the cable storage members and wrapped about the respective cable storage members as illustrated in FIG. 3.

It should be understood that a fiber optic jumper is a piece of fiber cable with typically similar connectors installed on both sides of the cable and typically used to link the equipment and components in fiber optic networks. Fiber optic jumpers can be single mode, or in other aspects, multimode. A fiber optic pigtail, on the other hand, is a piece of fiber optic cable that typically has one fiber optic connector on one side of the cable and there are single mode and multimode fiber optic pigtails with different types of fiber optic terminations such as SC, FC, ST, LC, MU, MT-RJ, MTP, MPO and similar terminations. Although as a general description the fiber optic pigtail can vary, it typically is used to link the fiber optic cable with fiber optic equipment with the fiber optic pigtail and its connector side used to link the equipment while the other side of the pigtail is fused together with fiber cable as a splice in one example.

As illustrated, a fiber optic connector 60 is supported by the support panel in the medial section at the side 24b and configured to connect fiber optic pigtails 62 and fiber optic jumpers 64. This fiber optic connector 60 in one aspect comprises an "n" position bulkhead fitting and, in the illustrated embodiment, is an eight position "bulkhead" fitting. At the other side 24a opposite the fiber optic connector is a fiber optic splice storage 70 and configured to store fiber optic cable splices 72 of the fiber optic pigtails and outside plant cable and jumpers. A better view of the splice storage 70 is shown in FIG. 2 in which a number of tabs 74 form splice channels 76 in which the splices can be inserted. Any different type of splice storage that holds splices is possible as a non-limiting example.

As illustrated in FIG. 3, cable guides 80 formed as tubes are positioned at the lower side edge of the panel near the pivoted end and secured at either side 24a, 24b at the lower end 26b. The fiber optic outside plant cable extends through one of the cable guide tubes and the fiber optic jumpers are passed through the other cable guide tube to route the cable onto the support panel and around the second cable storage member supported by the support panel. The fiber optic cable for the outside plant cable extends typically to the communications network and extends around the second cylindrically configured cable storage member 42 and forms a cable splice that is then stored in the splice storage 70 between the tabs 74 forming the splice channel while the fiber optic jumpers extend around the second cylindrically configured cable storage member 42 in the opposite direction as illustrated and terminate into the bulkhead fitting of the fiber optic connector 60. The fiber optic pigtails terminate into the bulkhead fitting and extend around the first cylindrically configured cable storage member 40 and in a splice and to the outside plant network. The fiber optic jumpers extend to transport equipment in a remote terminal in this non-limiting example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fiber optic connector panel, comprising:
a support panel having opposing sides and opposing ends and a pivot support member on either side at one end and configured to pivotally mount the support panel into a telecommunications fiber optic distribution cabinet, and further comprising:
a first cylindrically configured cable storage member having an outer cylindrical surface and supported by the support panel and configured as a cylindrical extension from the support panel to store any slack fiber optic pigtails around the outer cylindrical surface;
a second cylindrically configured cable storage member having an outer cylindrically configured surface supported by the support panel and spaced from the first cylindrically configured cable storage member and configured as a cylindrical extension from the support panel to store any slack outside plant cable and jumpers around the outer cylindrical surface;
a fiber optic connector supported by the support panel and configured to connect fiber optic pigtails and fiber optic jumpers; and
a splice storage member supported by the support panel and configured to store fiber optic cable splices of the fiber optic pigtails and outside plant cable and jumpers.

2. The fiber optic connector panel according to claim 1, wherein said support panel is configured as a type 307 connector block configuration.

3. The fiber optic connector panel according to claim 1, wherein said support panel is substantially rectangular configured.

4. The fiber optic connector panel according to claim 1, wherein said first cylindrically configured cable storage member is mounted on the support panel at the end opposite the pivot support members.

5. The fiber optic connector panel according to claim 4, wherein said second cylindrically configured cable storage member is mounted at the end opposite the first cylindrically configured cable storage member.

6. The fiber optic connector panel according to claim 1, wherein said first and second cylindrically configured cable storage members are spaced a distance from each other sufficient to create a clearance and allow any fiber optic cable pigtails and outside plant cable and jumpers to be inserted at the clearance and between the cable storage members and wrapped about a respective cable storage member.

7. The fiber optic connector panel according to claim 1, wherein said first and second cylindrically configured cable storage members are substantially the same size.

8. The fiber optic connector panel according to claim 1, wherein said fiber optic connector comprises an "n" position bulkhead fitting.

9. The fiber optic connector panel according to claim 1, wherein said fiber optic connector and said splice storage member are supported at opposing sides to each other and both in medial section of the support panel at the respective sides.

10. The fiber optic connector panel according to claim 1, and further comprising cable guides secured at either side at the end to be pivotally mounted through which fiber optic jumpers or fiber optic outside plant cable are routed.

11. A fiber optic connector panel that fits within a telecommunications fiber optic distribution cabinet and terminates and protects outside plant cables, comprising:
a substantially rectangular configured support panel that is configured as a type 307 connector block configuration and having opposing sides and opposing ends and a pivot support member on either side at one end and configured to pivotally mount the support panel into a telecommunications fiber optic distribution cabinet and at least one latch member configured to latch the support panel into position when pivoted into a closed position, and further comprising:
a first cylindrically configured cable storage member supported at one end by the support panel and configured to store any slack fiber optic pigtails;
a second cable storage member supported on the other end by the support panel and configured to store any slack outside plant cable and jumpers, wherein said first and second cylindrically configured cable storage members are spaced a distance from each other sufficient to create a clearance and allow any fiber optic pigtails and outside plant cable and jumpers to be inserted at the clearance and between the cable storage members and wrapped about a respective cable storage member;
a fiber optic connector supported by the support panel at one side in a medial section at the side and configured to connect fiber optic pigtails and fiber optic jumpers; and
a splice storage member supported by the support panel at the opposing side in a medial section at the side and configured to store fiber optic cable splices of the fiber optic pigtails and outside plant cable and jumpers.

12. The fiber optic connector panel according to claim 11, wherein said first cylindrically configured cable storage member is mounted by the support panel at the end opposite the pivot support members.

13. The fiber optic connector panel according to claim 12, wherein said second cylindrically configured cable storage member is mounted at the opposing end by the support panel opposite the first cylindrically configured cable storage member.

14. The fiber optic connector panel according to claim 11, wherein said first and second cylindrically configured cable storage members are substantially the same size.

15. The fiber optic connector panel according to claim 11, wherein said fiber optic connector comprises an "n" position bulkhead fitting.

16. The fiber optic connector panel according to claim 11, and further comprising cable guides secured at either side at the end to be pivotally mounted through which fiber optic jumpers or fiber optic outside plant are routed.

17. A telecommunications fiber optic distribution cabinet comprising:
    an enclosure and at least one fiber optic connector panel pivotally mounted therein, said connector panel comprising,
        a support panel having opposing sides and opposing ends;
        a first cylindrically configured cable storage member having an outer cylindrical surface and supported by the support panel and configured as a cylindrical extension from the support panel to store any slack fiber optic pigtails around the outer cylindrical surface;
        a second cylindrically configured cable storage member having an outer cylindrically configured surface supported by the support panel and spaced from the first cylindrically configured cable storage member and configured as a cylindrical extension from the support panel to store any slack outside plant cable and jumpers around the outer cylindrical surface;
        a fiber optic connector supported by the support panel and configured to connect fiber optic pigtails and fiber optic jumpers; and
        a splice storage member supported by the support panel and configured to store fiber optic cable splices of the fiber optic pigtails and outside plant cable and jumpers.

18. The telecommunications fiber optic distribution cabinet according to claim 17, and further comprising a slidable support tray mounted within the enclosure on which said support panel is pivotally mounted.

19. The telecommunications fiber optic distribution cabinet according to claim 17, wherein said support panel is configured as a type 307 connector block configuration.

20. The telecommunications fiber optic distribution cabinet according to claim 19, wherein said support panel is substantially rectangular configured.

21. The telecommunications fiber optic distribution cabinet according to claim 17, wherein said first cylindrically configured cable storage member is supported by the support panel at the end opposite the end that is pivotally connected.

22. The telecommunications fiber optic distribution cabinet according to claim 21, wherein said second cylindrically configured cable storage member is supported by the opposing end of the support panel opposite the first cylindrically configured cable storage member.

23. The telecommunications fiber optic distribution cabinet according to claim 17, wherein said first and second cylindrically configured cable storage members are spaced a distance from each other sufficient to create a clearance and allow any fiber optic pigtails and outside plant cable and jumpers to be inserted at the clearance and between the cable storage members and wrapped about a respective cable storage member.

24. The telecommunications fiber optic distribution cabinet according to claim 17, wherein said first and second cylindrically configured cable storage members are substantially the same size.

25. The telecommunications fiber optic distribution cabinet according to claim 17, wherein said fiber optic connector comprises an "n" position bulkhead fitting.

26. The telecommunications fiber optic distribution cabinet according to claim 17, wherein said fiber optic connector and splice storage member are supported at opposing sides and in a medial section of the support panel.

27. The telecommunications fiber optic distribution cabinet according to claim 17, and further comprising cable guides secured at either side at the end to be pivotally mounted through which fiber optic jumpers or fiber optic outside plant cable are routed.

28. A fiber optic connector panel, comprising:
    a support panel having opposing sides and opposing ends and a pivot support member on either side at one end and configured to pivotally mount the support panel into a telecommunications fiber optic distribution cabinet, and further comprising:
    a first cylindrically configured cable storage member supported by the support panel and configured to store any slack fiber optic pigtails;
    a second cable storage member supported by the support panel and configured to store any slack outside plant cable and jumpers;
    a fiber optic connector supported by the support panel and configured to connect fiber optic pigtails and fiber optic jumpers;
    a splice storage member supported by the support panel and configured to store fiber optic cable splices of the fiber optic pigtails and outside plant cable and jumpers; and
    wherein said support panel is configured as a type 307 connector block configuration.

29. A fiber optic connector panel, comprising:
    a support panel having opposing sides and opposing ends and a pivot support member on either side at one end and configured to pivotally mount the support panel into a telecommunications fiber optic distribution cabinet, and further comprising:
    a first cylindrically configured cable storage member supported by the support panel and configured to store any slack fiber optic pigtails;
    a second cable storage member supported by the support panel and configured to store any slack outside plant cable and jumpers;
    a fiber optic connector supported by the support panel and configured to connect fiber optic pigtails and fiber optic jumpers;
    a splice storage member supported by the support panel and configured to store fiber optic cable splices of the fiber optic pigtails and outside plant cable and jumpers; and
    wherein said fiber optic connector and said splice storage member are supported at opposing sides to each other and both in medial section of the support panel at the respective sides.

30. A telecommunications fiber optic distribution cabinet comprising:
- an enclosure and at least one fiber optic connector panel pivotally mounted therein, said connector panel comprising,
  - a support panel having opposing sides and opposing ends;
  - a first cylindrically configured cable storage member supported by the support panel and configured to store any slack fiber optic pigtails;
  - a second cable storage member supported by the support panel and configured to store any slack outside plant cable and jumpers;
  - a fiber optic connector supported by the support panel and configured to connect fiber optic pigtails and fiber optic jumpers;
  - a splice storage member supported by the support panel and configured to store fiber optic cable splices of the fiber optic pigtails and outside plant cable and jumpers; and
  - wherein said support panel is configured as a type 307 connector block configuration.

31. A telecommunications fiber optic distribution cabinet comprising:
- an enclosure and at least one fiber optic connector panel pivotally mounted therein, said connector panel comprising,
  - a support panel having opposing sides and opposing ends;
  - a first cylindrically configured cable storage member supported by the support panel and configured to store any slack fiber optic pigtails;
  - a second cable storage member supported by the support panel and configured to store any slack outside plant cable and jumpers;
  - a fiber optic connector supported by the support panel and configured to connect fiber optic pigtails and fiber optic jumpers;
  - a splice storage member supported by the support panel and configured to store fiber optic cable splices of the fiber optic pigtails and outside plant cable and jumpers; and
  - wherein said fiber optic connector and splice storage member are supported at opposing sides and in a medial section of the support panel.

* * * * *